US006813588B1

United States Patent
Daugert et al.

(10) Patent No.: US 6,813,588 B1
(45) Date of Patent: Nov. 2, 2004

(54) CONTROL SYSTEM AND METHOD FOR DETECTING PLUGGING IN DIFFERENTIAL PRESSURE CELLS

(75) Inventors: Richard D. Daugert, Trenton, NJ (US); Douglas W. Wilda, Santa Clara, CA (US)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 10/403,162

(22) Filed: Mar. 31, 2003

(51) Int. Cl.[7] .......................... G06F 11/30; G06F 15/00
(52) U.S. Cl. ...................................... 702/183
(58) Field of Search ........................ 702/183, 45, 47, 702/50, 113, 116, 138, 98; 73/1.59, 1.57, 1.34, 1.35

(56) References Cited

U.S. PATENT DOCUMENTS

| | | | |
|---|---|---|---|
| 2,057,767 A | | 10/1936 | Collins |
| 3,680,376 A | * | 8/1972 | Catheron ................. 73/861.61 |
| 4,231,262 A | | 11/1980 | Boll et al. |
| 4,528,847 A | | 7/1985 | Halmi |
| 4,654,813 A | | 3/1987 | Edlund et al. |
| 5,461,912 A | | 10/1995 | Gohara |
| 5,680,109 A | * | 10/1997 | Lowe et al. ................ 340/608 |
| 5,708,211 A | | 1/1998 | Jepson et al. |
| 5,739,429 A | | 4/1998 | Schmitkons et al. |
| 5,763,764 A | | 6/1998 | Mieczkowski et al. |
| 5,905,208 A | | 5/1999 | Ortiz et al. |
| 6,017,143 A | | 1/2000 | Eryurek et al. |
| 6,021,677 A | | 2/2000 | Hepner |
| 6,119,047 A | | 9/2000 | Eryurek et al. |
| 6,526,358 B1 | * | 2/2003 | Mathews et al. ............. 702/51 |
| 6,654,697 B1 | * | 11/2003 | Eryurek et al. ............... 702/47 |
| 2002/0029130 A1 | * | 3/2002 | Eryurek et al. ............. 702/183 |
| 2003/0208305 A1 | * | 11/2003 | Junk et al. .................. 700/282 |

FOREIGN PATENT DOCUMENTS

| | | |
|---|---|---|
| JP | 04328435 | 11/1992 |
| JP | 06109511 | 4/1994 |
| JP | 08136386 | 5/1996 |
| JP | 08166309 | 6/1996 |
| WO | WO 97/45716 | 12/1997 |

OTHER PUBLICATIONS

Taya et al., "Detecting blockage in process connections of differential pressure transmitters", Jul. 26–28, 1995, IEEE, SICE'95, Proceedings of the 34th SICE Annual Conference, pp. 1605–1608.*

Amadi–Echendu et al., "Signal analysis applied to detect blockages in pressure and differential pressure measurements systems", May 10–12, 1994, Instrumentation and Measurement Technology Conference, 1994. IMTC/94. Advanced Technologies, p. 741–744.*

* cited by examiner

Primary Examiner—John Barlow
Assistant Examiner—Demetrius Pretlow
(74) Attorney, Agent, or Firm—Ohlandt, Greeley, Ruggiero & Perle, L.L.P.

(57) ABSTRACT

A method and control system that monitors the high frequency or commonly referred to as the "noise" component of a measurement signal to detect plugging conditions in fluid flow systems monitored by DP-cell based sensors. This high frequency component has contributions from the process factors like disturbances, user actions and random effects like turbulence. A test statistic θ(t) has been developed that monitors the proportion of variance introduced by the first two factors and the third factor. By monitoring this proportion, it is possible to detect a frozen sensor that is characterized by a dramatic reduction in the variance due to process factors over a sufficiently long detection window. The method and control system uses random sampling intervals to improve data quality. The sampling rate is also reduced by taking samples at a lower rate and then reconstructing the original signal from fewer data points.

4 Claims, 3 Drawing Sheets

CONTROL SYSTEM AND METHOD FOR DETECTING PLUGGING IN DIFFERENTIAL PRESSURE CELLS

BACKGROUND

1. Field of the Invention

The present invention relates to process control systems, and more particularly, to pressure transmitters.

2. Description of the Related Art

There is a strong desire to detect plugged impulse lines in petrochemical plants and refineries using only the information available at a standard differential pressure cell (DP-cell). Many approaches to this problem use various statistical analysis techniques, such as wavelet processing or fast Fourier transforms to examine the higher frequency signals that are normally present on the differential pressure signal and determine if one or both of the inlet ports to a transmitter is plugged. The desired signal processing capability requires computational power and sampling rates that are well beyond what the standard differential pressure transmitter is able to achieve. This is because the standard differential pressure transmitter is extremely limited in its use of electrical power. The need for high sample rates to properly resolve the high frequency information increases the power required in the measuring instrument. There is a need for an improvement to a control system and method for detecting plugging in differential pressure cells that reduces the required sampling rate.

The time scale of plugging is generally much larger than the time scale of process condition variations. In applications where flow is measured, the process condition varies rapidly and the information relevant to determine an imminent plugged condition is at frequencies greater than 100 Hz. To gather this information in a manner consistent with the low power constraints imposed on these devices, the present inventors have discovered that a substantial improvement can result by decreasing the sampling rate significantly by taking samples at random time intervals. Turning to the present invention, samples are taken at a lower rate, taken at random times, and reconstructed into time scales suitable for processing. The present invention greatly reduces the sampling rate and also improves the information quality. First, samples taken over a longer period of time reduce the data-corrupting effects of small perturbations in samples taken over short periods. Second, taking samples at a lower rate and then reconstructing the original signal from fewer data points also reduces the required sampling rate. Third, random sample intervals are less correlated to periodic fluctuations in a process system. The present inventors have discovered that this is important because the control system and method for detecting plugging in differential pressure cells depends on the process noise and the flow noise being non-correlated. Changing from fixed sampling intervals to random sampling intervals improves data quality by reducing the possibility of having periodic disturbances in the process conditions alias the apparent process information.

SUMMARY OF THE INVENTION

One embodiment of the present invention is a method for detecting plugging in differential pressure cells. Output of a differential pressure transmitter is sampled at random intervals that are then reconstructed into a time varying output that represents the process signal to produce samples and plugging is detected based on the samples. In another embodiment, the z-statistic is tested for a zero velocity condition. A variance of said samples is calculated. A baseline value is updated based on the variance. A variance factor is developed by comparing the samples with the updated baseline value. It is determined whether the variance factor exceeds a threshold. A frozen sensor alert is provided when the zero velocity condition is met or the variance factor exceeds the threshold. In still another embodiment, a window is constructed from the samples and a variance of the samples in the window is calculated from the mean and the previous mean. In yet another embodiment, a mean of the samples is calculated. A z-statistic is generated from the mean and a previous mean.

These and other features, aspects, and advantages of the present invention will become better understood with reference to the drawings, description, and claims.

DETAILED DESCRIPTION OF THE PREFERRED EMBODIMENTS

In the following detailed description, reference is made to the accompanying drawings. These drawings form a part of this specification and show by way of example specific preferred embodiments in which the present invention may be practiced. These embodiments are described in sufficient detail to enable those skilled in the art to practice the present invention. Other embodiments may be used and structural, logical, and electrical changes may be made without departing from the spirit and scope of the present invention. Therefore, the following detailed description is not to be taken in a limiting sense and the scope of the present invention is defined only by the appended claims.

Figure 1:
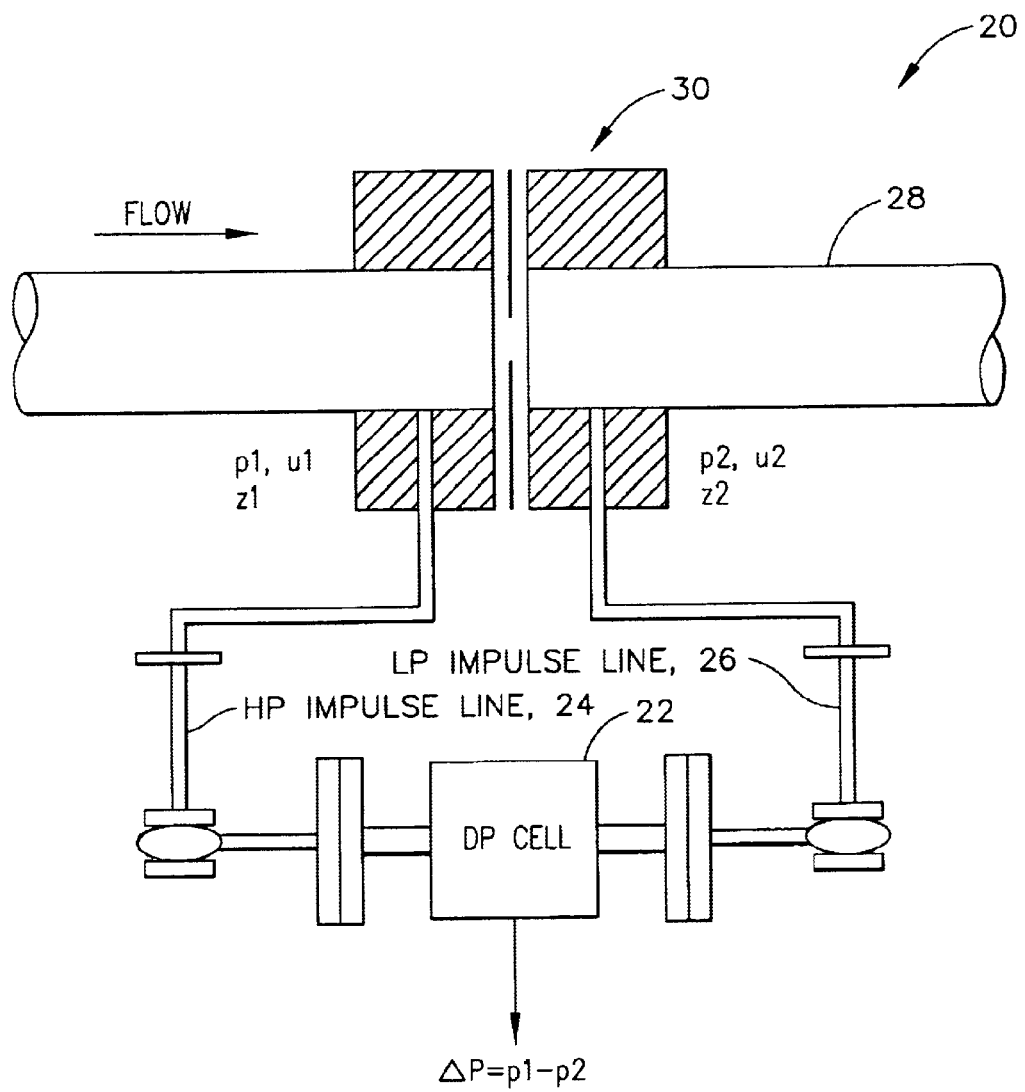
FIG. 1 is a schematic diagram of a control system of the present invention for measuring fluid flow and/or level.

Referring to FIG. 1, a measurement system 20 includes a DP-cell 22 that is connected via a pair of impulse lines 24 and 26 to a pair of spaced apart points on a pipe 28 to measure the flow of a fluid therethrough. A flange arrangement 30 is disposed on pipe 28 to facilitate the connection of impulse lines 24 and 26 to pipe 28. For the indicated flow direction, impulse line 24 is a high pressure line and impulse line 26 is a low pressure line. The fluid pressure, velocity and elevation on the high pressure side are denoted by p1, u1 and z1, respectively. The fluid pressure, velocity and elevation on the low pressure side are denoted by p2, u2 and z2, respectively. Flange arrangements 32 and 34 are disposed in impulse lines 24 and 26, respectively, to facilitate service of DP-cell 22. DP-cell 22 is operative to provide a pressure signal that is a difference between p1 and p2. According to Bernoulli, the pressure drop p1–p2 can be modeled as:

$$\Delta p = p_1 - p_2 = \frac{\rho}{2} * (u_2^2 - u_1^2) + \rho * (z_2 - z_1) \tag{2}$$

where $\rho$ is the average density.

Figure 2:
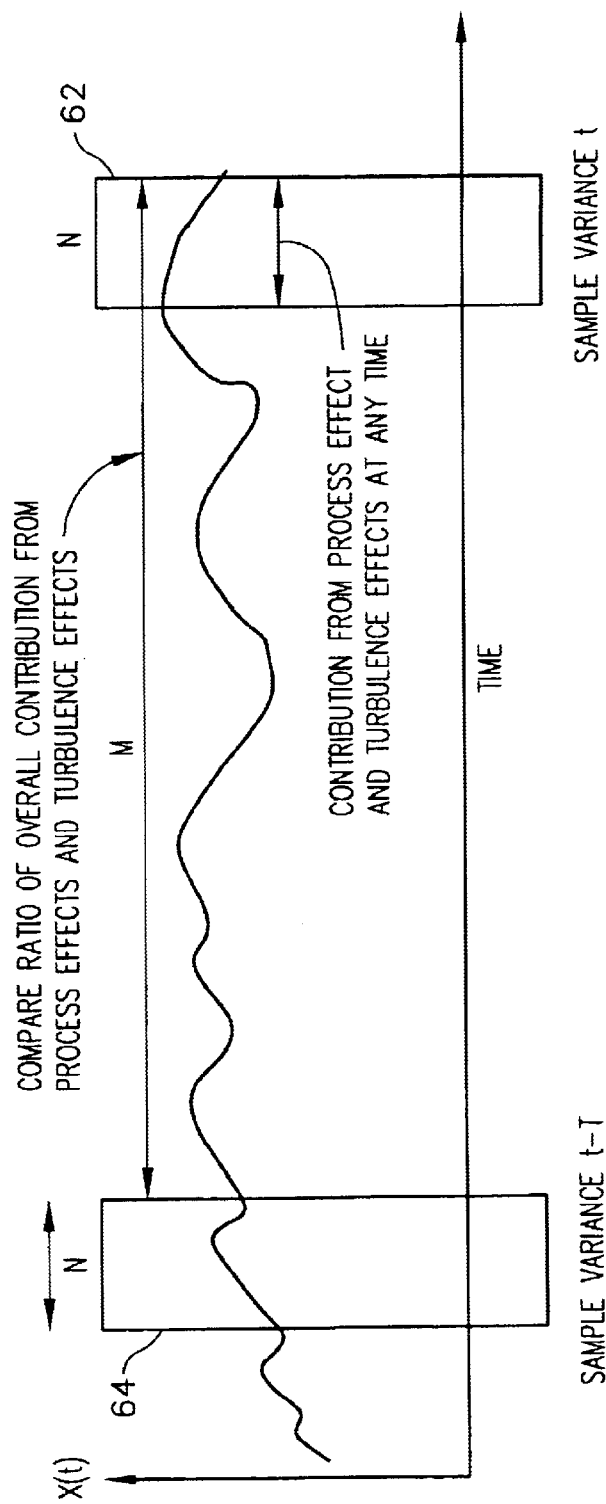
FIG. 2 depicts in graphical form a sample comparison step of the method of the present invention.

Referring to FIG. 2, the test statistic $\theta(t)$ at current time t is calculated over a window 62 consisting of N sensor signal samples. This is compared with the baseline statistic developed based on a window 64 of samples taken at an earlier time T. Time T is a function of a random number generator. The comparison is of a ratio of a variance contribution due to process effects and a contribution due to turbulence effects with those established by the baseline. The baseline can be established in a laboratory by careful calibration. However, in practice, the baseline value is preferably updated to take into account the natural aging of the physical device and associated pipes. Thus, when window 62 slides right upon arrival of a new reading, the baseline calculation is also updated using a exponentially-weighted moving average window scheme. Thus, the frozen sensor detection comparison is relative to baseline established T samples ago.

According to the method of the present invention, the sliding baseline calculation is implemented using a recursive covariance matrix. The recursive formula is given by:

$$covX(t) = \frac{M}{M-1}covX(t-1) + \frac{1}{M-1}X(t)X(t)^T \quad (22)$$

The ramp test given by equation (21) is done using a z-statistic, which tests whether the mean of the first difference is statistically non-zero.

$$\Delta \bar{y}(t) = k\Delta t \neq 0, \quad \text{but } S^2_{\frac{2}{y}}(t) = 0 \quad (21)$$

Figure 3:
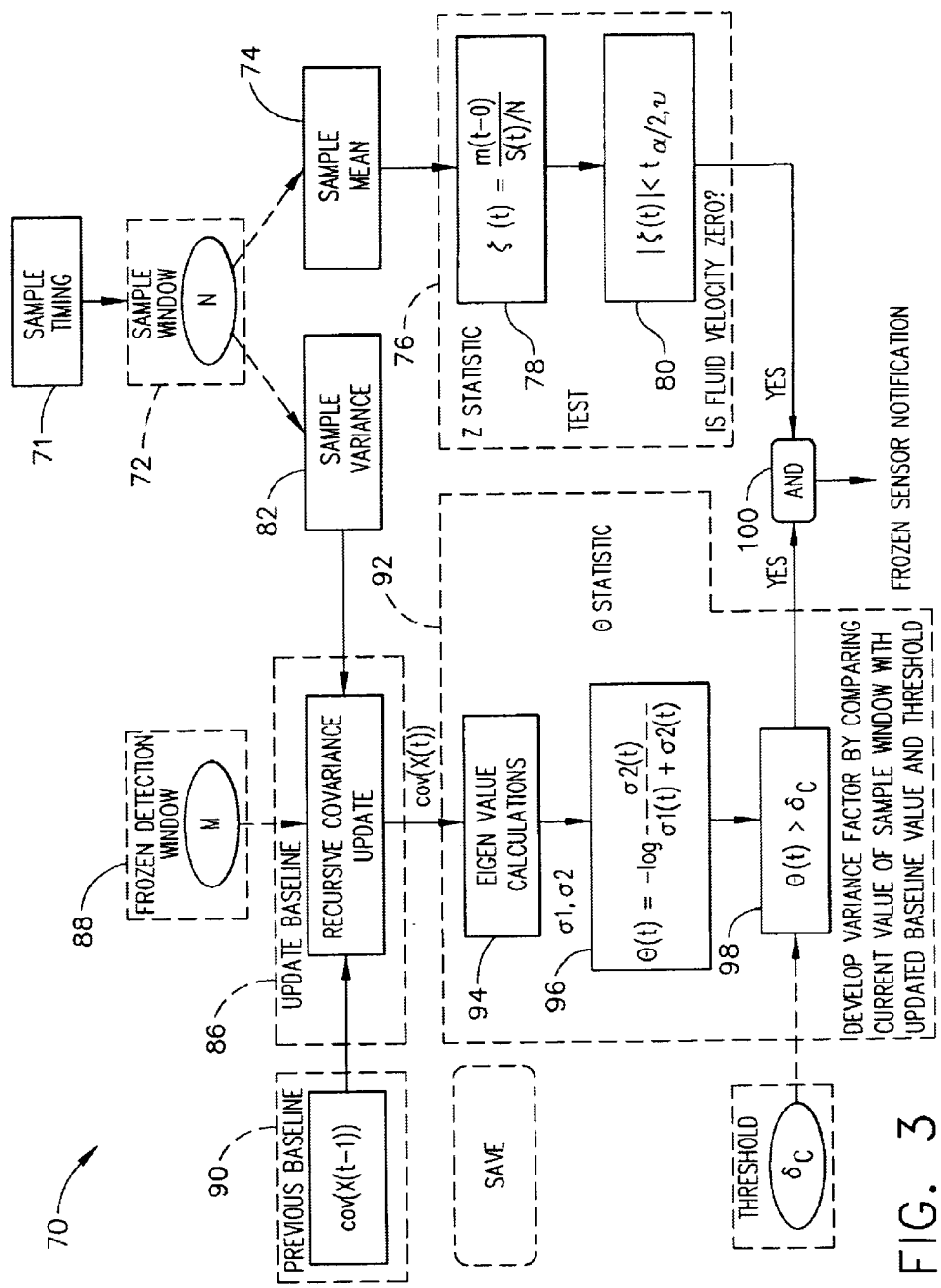
FIG. 3 is a flow diagram of a frozen sensor detection program.

Referring to FIG. 3, a plugging detection program 70 step 71 determines sample timing. An output of a differential pressure transmitter, such as the ST3000 model available from Honeywell International in Morristown, N.J., is sampled at random intervals to produce samples. The random intervals are determined by a random number generator mapped onto a range determined by system and hardware constraints. For example, a lower bound of the range might be ten seconds. Preferably, sampling is done over long periods of time avoiding any aliasing effects and increasing efficiency and reducing power usage. To avoid aliasing effects, the sampling interval is at least a factor of three faster than any frequency of interest. Random intervals accumulate similar information as fixed intervals, but in a shorter time frame because more of the frequency information is preserved. The sampling rate is reduced by taking samples at a lower overall rate. By keeping track of the time at which the sample was taken, the original signal can be reconstructed. Sample timing step 71 keeps track of wait states, stores sample times and sample values, and calculates intervals for sample window 72.

At step 72, a series of N samples of the DP-cell sensor is obtained. Consecutive windows advance by at least one sample. Step 74 calculates a mean of the N samples of a window. Step 76 tests the mean to determine a zero velocity condition. That is, step 76 determines whether the fluid velocity is zero. For this determination, step 78 generates a z-statistic and step 80 tests the z-statistic for the zero velocity condition.

Step 82 calculates the variance of the N samples collected over the window. Step 86 updates the baseline based on the output of step 82, a frozen detection window M provided by step 88 and a previous baseline 90 provided by step 90 by using equation (22). Step 92 implements the frozen detection theorem. That is, step 92 develops a variance factor using the most recent N values of the sensor signal, compares it with an updated baseline value and a specified threshold. If the result of this comparison exceeds the threshold, the variance factor or yes flag is generated. Step 94 develops the eigen values by using equation (16).

$$[\Sigma(t) \quad V(t)] = pca(covX(t)) \quad (16)$$

Eigen Values: $\Sigma(t) = [\sigma_1(t) \quad \sigma_2(t)]$

Eigen Vectors: $V(t) = [v_1(t) \quad v_2(t)]$

Step 96 uses the eigen values in equation (17) to develop the test statistic $\theta(t)$.

$$\theta(t) = -\log\left(\frac{\sigma_1(t)}{\sigma_1(t) + \sigma_2(t)}\right) \quad (17)$$

Step 98 compares the test statistic $\theta(t)$ with the threshold and if greater, generates the variance factor flag.

Step 100 gives a frozen sensor notice or alert when the zero fluid velocity condition and the variance factor flag are simultaneously developed.

During the frozen sensor development phase, the decisions about the following parameters are made:

1. The number of samples, N, used in the calculation of the sample variance given by equations (13) and (14)

$$S_L^2(t) = S_{\frac{2}{L}}^2(t) + S_{L'}^2(t) \quad (13)$$

$$S_m^2(t) = S_{\frac{2}{m}}^2(t) + S_{m'}^2(t) \quad (14)$$

2. The detection window size, M. The larger the size, the less likely of false positives.

3. The detection threshold, $\delta_f$.

The method of the invention was applied to an example of measuring level in a tank at a petrochemical plant, with a sampling rate of 1 min. For this example, N=10 and a detection window of M=50×N=500 samples was chosen. In order to determine the detection threshold, $\delta_f$, the test statistic $\theta(t)$ was calculated using data segments over a two year period for which the operator reported no anomalies. Other applications, such as flow measurement at an orifice would require higher sampling rates.

It is to be understood that the above description is intended to be illustrative and not restrictive. Many other embodiments will be apparent to those of skill in the art upon reviewing the above description, including implementation with various equivalent components, software, and circuits and other similar differences. The present invention has applicability to many applications of detecting plugging in differential pressure cells that could be more efficient with random sampling. Therefore, the scope of the present invention should be determined with reference to the appended claims, along with the full scope of equivalents to which such claims are entitled.

What is claimed is:

1. A method for detecting plugging in differential pressure cells, comprising:

sampling an output of a differential pressure transmitter at random intervals to produce samples; and detecting plugging based on said samples.

2. The method according to claim 1, wherein said step of detecting plugging comprises:
   testing a z-statistic for a zero velocity condition;
   calculating a variance of said samples;
   updating a baseline value based on said variance;
   developing a variance factor by comparing said samples with said updated baseline value;
   determining whether said variance factor exceeds a threshold; and
   providing a frozen sensor alert when said zero velocity condition is met or said variance factor exceeds said threshold.

3. The method according to claim 2, further comprising:
   constructing a window from said samples;
   wherein calculating said variance is performed by calculating said variance from said samples in said window.

4. The method according to claim 2, wherein said step of detecting plugging based on said samples further comprises:
   calculating a mean of said samples; and
   generating said z-statistic from said mean and a previous mean.

* * * * *